United States Patent Office 2,782,178
Patented Feb. 19, 1957

2,782,178
BINDERS FOR FIBROUS PRODUCTS

Homer W. Duffee, Newark, and Marshall C. Armstrong, Hebron, Ohio, assignors to Owens-Corning Fiberglas Corporation, Toledo, Ohio, a corporation of Delaware No Drawing. Application February 9, 1952,
Serial No. 270,903

25 Claims. (Cl. 260—33.4)

This invention relates to mineral fiber products and especially to bonded glass fiber bats, employing resinous materials to adhere the fibers in the bat. This application is a continuation-in-part of the copending application Ser. No. 782,040, filed on October 24, 1947, and now abandoned.

Very effective use is made of bonded glass fiber masses for heat, sound and electrical insulations, as structural and as acoustical board, especially where compositions of the inert glass fibers with resinous material provide products having the properties of porosity, strength, high resiliency and fixed dimension. By regulating the amount of resinous material and the method of forming, the density and rigidity of the product can be varied in accordance with the requirements of the many applications. For instance, extremely light densities of about 1½ pounds per cubic foot with sufficient rigidity for wall insulation, outer wrappings and cardboard core masses, have been formed with a resinous binder content ranging from 2 to 6 percent by weight of the product. More rigid and dense insulation requires correspondingly more binder, densities as high as 12 to 15 pounds per cubic foot, suitable for structural board and domestic coverings for walls, being obtained with 10 to 15 percent resinous binder.

An object of this invention is to produce a bonded glass fiber product having the properties of porosity, fixed dimension, high moisture resistance, flexibility and good feel and without the undesirable properties of brashiness and fly.

Another object is to produce a bonded product, which is relatively free from color, enabling the same to be tinted to any desired shade by externally or internally applied ordinary coloring means.

A further object is to produce a relatively non-combustible and non-inflammable glass fiber product, which is free from the danger of combustion at elevated temperatures, thereby to meet the requirements for marine insulation and any other application where inflammability is a hazard.

A still further object is to produce a porous bat of glass fibers held to fixed dimension by a resinous binder based on a heat hardenable and colorless nitrogenous aldehyde resin-forming material, the reaction rate of which has been slowed to enable controlled cure in manufacture, and containing other materials in admixture with the nitrogneous aldehyde resin for imparting resiliency, elasticity, feel, compressibility and improved moisture resistance to the bat.

A still further object is to produce an efficient method for economically manufacturing mineral fiber products bonded with urea-formaldehyde resins admixed with other ingredients for slowing down the polymeric reaction rate of the urea-formaldehyde, for lubricating the fibers and flexibilizing the product to improve the resiliency and feel while reducing brashiness and fly, and for improving the water resistance and toughness of the product, all of which may be combined with urea-formaldehyde resinous material without adversely and noticeably affecting the water white color, non-combustibility and non-punking characterisics of the product.

On account of their water white color, low cost, and non-punking characteristics, it is desirable to employ the nitrogenous resin forming materials, such as the thermosetting resinous reaction products of urea, melamine, guanidine and the like with formaldehyde, butyraldehyde or other aldehydes and ketones, as the binder in many glass fiber combinations.

Importance is directed to the non-punking characteristics of the urea-type resins; non-punking being described as the property of the resin enabling avoidance of smoldering and combustion even though an isolated portion of the material may be above the resinous reaction or decomposition temperature. Since the decomposition products of the nitrogenous resin compounds are mostly of the type which are non-combustible or have a high flash point, such as carbon dioxide and ammonia, temperatures in excess of 700° C. may be reached without danger. This is unlike many other organic binders which exothermically react so that the reaction or decomposition rate is accelerated, in view of the inability of the added heat to escape, until the flash point of one of the decomposition products is reached. In the latter case, such smoldering may continue undetected for a long time with the result that fires might take place while the product is in transit or storage and be destroyed along with adjacent materials. This is not only costly but detracts from the salability of the products.

Acceptance of urea and other nitrogenous aldehyde resins as the bonding agent in glass fiber products has been decidedly limited on account of their brittleness causing the product to be stiff and brashy and correspondingly poor in fly. Objection is also made to their rapid and often uncontrolled cure even at relatively low temperature. When applied as "A" stage resin to the glass fibers in the forming hood, such rapid and often uncontrollable cure takes place, that the resinous material is dry and hard before the resin coated fibers reach the collecting platform. In this condition, the resins are no longer able strongly to adhere one fiber to another in the bat. Even if the resins are not already hardened on reaching the collecting platform, their flow is of such short duration and so limited that migration to the fiber intersection is prevented and only a small amount of the bonding agent functions in the manner for which it was intended.

In order advantageously to employ the low cost, water white, non-punking, glass fiber adherent urea-formaldehyde and other nitrogenous aldehyde resinous reaction products as the bonding agent for glass fibers, it has been found necessary to retard the resinous reaction rate so that fabrications can be carried out in an efficient manner and also to flexibilize the resin so that the product will have good feel, resiliency, elasticity and will be devoid of brashiness and fly. Naturally it is desirable to carry out these improvements without adding color or rendering the product inflammable.

It has been found that the polymeric reaction rate of urea formaldehyde resin forming materials such as urea formaldehyde, melamine formaldehyde and guanidine formaldehyde and mixtures thereof is effectively slowed for better control by the presence of an elastomer in admixture with the "A" stage urea type resin. It is not necessary that a large amount of elastomer be present because desirable results have been obtained when the binder in the absence of other modifying agents contains from 2 to 20 percent by weight of the elastomer. In the presence of other modifying agents of the type which will hereinafter be described for achieving better control of the reaction rate of the urea-aldehyde type resins, less than the described amounts of elastomer may be used. The preferred elastomer is polybutene or polyisobutene having an average molecular weight of from 1,000 to 20,000. There is reason to believe that other elastomers of the type polychloroprene, butadieneacrylonitrile copolymer, polyethylene, plasticized vinyl chloride and organo-silicon elastomers may be used to advantage.

These rubber-like materials, especially polybutene and polyisobutene, appear to be incompatible with the urea formaldehyde type resinous reaction products. It is perhaps because of this apparent incompatibility that the elastomer functions to impart greater flexibility, resiliency, good feel and softness to the bonded glass fiber wool product. As a result the undesirable characteristics of brashiness and fly which has heretofore characterized products formed with phenol formaldehyde resin as well as with the urea formaldehyde type resins is substantially eliminated. In combination with the urea type resins in the binder composition, the elastomer functions in addition as a lubricant for the glass fibers. Since the elastomers described have little, if any, color, they do not undesirably alter the water-white color of the base resin or impart undesirable color to the bonded fibrous structure formed therewith.

Solvents may be used to formulate a binder composition of these elastomeric materials in combination with the urea-aldehyde type resins, but for purposes of economy and for safety, they are generally incorporated into the binder composition as a latex. The "A" stage urea type resins are generally soluble in water and may be combined with the latex in water solution to form a stable binder composition. Latex formation is often aided by first softening the elastomer with a true solvent of the type xylene, benzene or other hydrocarbons, especially if the rubber-like material is a polybutene having high molecular weight.

The following example of a binder composition of the type described is given by way of illustration, but not by way of limitation:

Example 1

To 135 parts Urac 180, a product of the American Cyanamid Company of New York, containing 66 percent "A" stage urea formaldehyde resin in water solution, there is added 100 parts latex containing 10 percent of the 1,000 M. W. polybutene (Vistanex). The two materials when combined, form a stable milky composition, which may be diluted with water to a solids content ranging from 2 to 20 percent depending on the demands of the occasion; ordinarily an 8 percent composition is used. The liquid treating composition is applied to the glass fibers in an ordinary manner, such as by spraying onto the surface of the glass fibers as they are rained down from above, through a forming hood, and collected in a layer on a transversley moving belt. The thickness of the fibrous layer is conveniently regulated by the speed of travel of the belt and the amount of binder incorporated is effectively regulated by spraying more or less of the binder, as desired, into the forming hood.

In actual practice, the temperature of the forming hood may run as high as 300° F. However, best results are obtained when the temperature is held within the range of 125 to 175° F. At this temperature, the urea formaldehyde reaction is readily controlled so that it is not reacted to the ultimate stage of polymeric growth. During the short period that it is within the hood, sufficient flow remains in the binder to enable the resinous material to migrate to the fiber intersections where it is more effective in bonding the fibers one to another. Perhaps this is the reason for securing products of fixed dimension with such low resinous binder content as 1.5 percent.

Subsequently, the resin coating layer of fibrous material is baked in a temperature range of 350 to 450° F. for from 5 to 10 minutes, or such time and temperature as is necessary to convert the thermosetting resinous components to the ultimate stage of polymeric growth. If during this conversion reaction the fibrous layer is compressed, the converted resinous binder causes the compressed shape to be retained and a densified mass or board of fixed dimension is thereby produced. Depending upon the amount of resin and the extent of compression, bat densities ranging from 1 to 15 and even 20 pounds per cubic foot have been produced.

Inspection of the final product indicates that the apparent incompatibility which exists between the resinous polymer and the elastomer permits each to impart some of their original characteristics to the final product. For example, the final product is characterized by the rigidity and fixed dimension contributed by a cured urea formaldehyde type resin while also being characterized by the flexibility, softness and elasticity resulting from the presence of the elastomer so that the product combines the desirable characteristics of bond and enjoys properties not heretofore obtained by the use of urea formaldehyde or phenol formaldehyde bonding materials of the type heretofore employed.

It has been found that the urea formaldehyde type resin forming materials may be compounded with other related substances to slow and control the reaction rate thereby to require less, if any, of the elastomer. For example, the polymerization reaction rate of urea formaldehyde type resins which have heretofore been used as a bonding agent for the preparation of bonded glass fiber structures may be slowed and controlled when combined in the binder mixture with a methylated urea, the characteristics of which are such that it cannot, by itself, be used as a binder but is effective to slow the reaction rate of the urea formaldehyde type resin and permit more desirable control thereof. A very desirable binder composition not requiring the elastomer to slow the reaction rate may be formulated with about one part by weight methylated urea to 2 to 5 parts by weight of urea formaldehyde resin or the like. Less of the methylated urea may be used in the presence of other modifying agents such as elastomers or the like.

The term "methylated urea" as used herein refers to urea

having at least one and preferably two of its hydrogens substituted with an alkyl group of the type methyl, ethyl, propyl and the like short chain groups, represented by the formulae

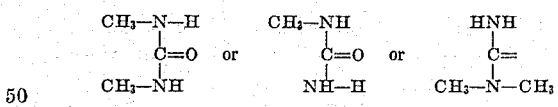

When, as it is preferred, the methylated urea is reacted with formaldehyde the available methylol groups provide for a type of straight chain condensation polymerization as distinguished from the rapidly thermosetting cross-linked polymers of urea formaldehyde whereby the presence of the methylated urea resin forming material markedly reduces the critical nature of the urea formaldehyde reaction to the cured stage. The methylated urea reacted with formaldehyde to form methylol groups thereon remains sufficiently soluble in water to permit incorporation in combination with the urea formaldehyde resin forming material in formulation of the binder composition alone or in combination with the elastomers, as heretofore described. Three of the hydrogen groups available on the urea molecule may be alkylated with methyl, ethyl, propyl groups and the like in some instances if the urea molecule forms the blocking or end groups on the polymer chain.

When the elastomer is omitted from the binder composition or small amounts thereof are used, it is desirable to incorporate a waxy or oily lubricant normally incompatible with the resinous binder, such for example as mineral oils, sulfonated mineral oils or the tempering oil emulsions of the type described in United States Patent to Williams et al. No. 2,083,132.

We have further discovered that, although the moisture resistance of the bonded mat is somewhat improved by the presence of the elastomer in the binder composition, marked improvement in water resistance, weathering resistance and toughness results when polystyrene is incorporated as an ingredient in the binder composition. The improvements resulting from the presence of polystyrene are evident even though the binder is of the type formulated with very little, if any, elastomer. Additions of polystyrene to the binder composition may be made in amounts ranging from one part by weight polystyrene to 2 to 5 parts by weight of the urea formaldehyde resin and the like or other nitrogenous aldehyde resin forming combinations, such as the combination of urea formaldehyde with methylated urea formaldehyde resin forming materials. It is preferred to make use of polystyrene having a molecular weight average of 65,000 to 95,000.

Polystyrene in aqueous dispersion is miscible with the "A" stage nitrogenous aldehyde resin solution and may be mixed therewith before, with or after the elastomer, if used, is incorporated. The polystyrene may be wholly or partially replaced by other water resisting resinous materials and derivatives thereof, such for example, as coumarone-indene, Vinsol, polyacrylates, polyalkylacrylates, and resin derivatives of the type hydrogenated methyl abietate (Hercolyn) and methyl abietate (Abalyn), manufactured by the Hercules Powder Company, of Wilmington, Delaware. Of the latter group of materials, polystyrene is preferred on account of its water white color and availability as a low cost material, but others of the group may be used where slight discolorations are unimportant. Although these materials are combustible their concentration in the binder is not sufficient to alter the combustibility characteristics of the binder, that is, they do not cause the binder to punk or support combustion.

Other binder formulations for treating glass wool fibers to form bats of the desired characteristics are illustrated by the following:

*Example 2*

75 parts by weight "A" stage urea formaldehyde resin in aqueous solution
25 parts by weight methylated urea resin forming material in powder form The urea formaldehyde resin forming material and methylated urea resin forming material are first combined in water solution and diluted to a concentration of 2 to 20 percent by weight for application as a binder onto glass fibers.

*Example 3*

75 parts by weight "A" stage urea formaldehyde resin in aqueous solution
24.5 parts by weight methylated urea resin forming material
0.5 part by weight sulfonated mineral oil The urea formaldehyde and methylated resin forming materials are first combined in water solution and the dispersion of the sulfonated oil incorporated therewith and then the materials are diluted with water to a solids content of about 3 percent by weight.

*Example 4*

6 percent "A" stage urea formaldehyde
2 percent methylated urea resin forming material
0.5 percent oil emulsion prepared in accordance with the Williams et al. patent
0.5 percent polyester resin of the type alkyd
91 percent water The urea formaldehyde and methylated urea resin forming material are first combined and diluted with water to 8 percent solids to which the oil and alkyds are mixed.

*Example 5*

5.0 percent "A" stage urea formaldehyde
1.0 percent polystyrene 85,000 average M. W.
1.0 percent polybutene 1,000 average M. W.
93.0 percent water

*Example 6*

68 parts "A" stage urea formaldehyde resin in aqueous solution.
22 parts methylated urea resin forming material
10 parts polybutene in aqueous emulsion M. W. 1,000

The urea formaldehyde and methylated urea are first combined in water solution. The solution and emulsion are mixed to form a stable milky treating composition that may be applied to the glass fiber surfaces in the ordinary manner previously described.

*Example 7*

4.5 percent "A" stage urea formaldehyde
1.5 percent methylated urea resin forming material
1.0 percent polystyrene 85,000 average M. W.
1.0 percent polybutene 1,000 average M. W.
92.0 percent water A water solution of the urea formaldehyde and methylated urea is effected, to which the polystyrene originally in aqueous emulsion is added with stirring. The latex is then added and the entire mixture diluted with the remainder of water to the desired consistency.

*Example 8*

6 percent by weight "A" stage urea formaldehyde resin
2 percent by weight methylated urea resin forming material
0.5 percent by weight mineral oil in emulsion form
1.5 percent by weight polybutene in aqueous emulsion M. W. 1,000
90 percent by weight water

*Example 9*

6 percent by weight "A" stage urea formaldehyde
2 percent by weight methylated urea resin forming material
0.5 percent by weight oil emulsion prepared in accordance with the Williams et al. patent
0.5 percent by weight polyester resin of the type alkyd
1 percent by weight polyisobutene
90 percent by weight water

*Example 10*

1 percent by weight polystyrene, 85,000 M. W.
1 percent by weight polybutene, 85,000 M. W.
98 percent by weight water Alternatively, we have found that the methylated urea may be wholly or partially replaced by polyhydric alcohols of the type ethylene glycol, propylene glycol and even the polyglycols, commercially available under the trade name of Carbowax from the Carbide and Carbon Chemical Corporation of New York. Increased flow of the nitrogenous resinous materials results from their use. The lower molecular weight polyhydric alcohols, i. e., ethylene glycol or propylene glycol, when used, behave as fugitive solvents which escape after serving their intended function.

Illustrative formulations employing these polyhydric alcohols are as follows:

*Example 11*

5.0 percent by weight "A" stage urea formaldehyde
1.5 percent by weight methylated urea formaldehyde resin forming material
1.0 percent by weight propylene glycol
92.5 percent by weight water

Example 12

5.0 percent by weight "A" stage urea formaldehyde
1.5 percent by weight methylated urea formaldehyde resin forming material
1.0 percent by weight propylene glycol
1.0 percent by weight polystyrene, 85,000 average M. W.
91.5 percent by weight water

Example 13

6.0 percent by weight "A" stage urea formaldehyde
2.0 percent by weight ethylene glycol
1.0 percent by weight polybutene, 1,000 average M. W.
91.0 percent by weight water

Example 14

5.0 percent "A" stage urea formaldehyde
1.0 percent propylene glycol
1.0 percent polystyrene 85,000 average M. W.
1.0 percent polybutene 1,000 average M. W.
92.0 percent water A cardinal feature of this invention resides in the means enabling the use of water-white, non-combustible, thermosetting urea type resins as the binder for glass wool products, the means including the addition of an imcompatible elastomer for reducing the reaction rate of the urea polymerization apart from or in combination with the formulation of the urea type resin of nitrogenous aldehyde resin forming components of slow and fast reaction rates. The elastomer existing as the dispersed phase in the urea type reaction products nullifies the hardness and brittleness of the cured resinous reaction product so that the bat is resilient, elastic and has exceptionally good feel. In view of the water white qualities of the binder, it is apparent that pigments may be incorporated in the binder composition to impart color to the final product or that a pigmented surface coating may be applied to the bat without altering the characteristics thereof.

It is to be understood that various combinations and substitutions of related materials, other than those specifically named may be made, and that numerous changes in the methods of binder application and the treatment of the coated fibers to produce the desired properties in a bonded glass wool mat, may be effected without departing from the spirit of the invention, especially as defined in the following claims.

We claim:

1. A bonded glass fiber product comprising glass fibers and a binder securing the fibers together containing the resinous reaction product of formaldehyde with an amide selected from the group consisting of urea, melamine, guanidine and mixtures thereof and methylated urea present in the ratio of 1 part by weight methylated urea to 2–5 parts by weight amide.

2. In a bonded glass fiber product, a mass of glass fibers and 1½–15 percent by weight of a binder securing the fibers together and consisting essentially of urea and methylated urea reacted with formaldehyde and present in the ratio of 1 part by weight methylated urea to 2–5 parts by weight urea.

3. A bonded glass fiber product comprising glass fibers and a binder securing the glass fibers one to another containing the resinous reaction product of formaldehyde with an amide selected from the group consisting of urea, melamine, guanidine and mixtures thereof and methylated urea present in the ratio of 1 part by weight methylated urea to 2–5 parts by weight amide, and up to 20 percent by weight of a material selected from the group consisting of polybutene, polystyrene, polychloroprene, butadiene-acrylonitrile copolymer, polyethylene and plasticized polyvinyl chloride.

4. In a bonded glass fiber product, a mass of glass fibers and 1½–15 percent by weight of a binder securing the fibers together and consisting essentially of urea, and methylated urea reacted with formaldehyde and present in the ratio of 1 part by weight methylated urea to 2–5 parts by weight urea, and from 2–20 percent by weight polybutene.

5. A bonded glass fiber product comprising glass fibers and a binder securing the fibers together containing the resinous reaction product of formaldehyde with an amide selected from the group consisting of urea, melamine, guanidine and mixtures thereof and methylated urea present in the ratio of 1 part by weight methylated urea to 2–5 parts by weight amide, and a water repellent resin in amounts ranging from 1 part by weight resin to 2–5 parts by weight of the reaction product.

6. In a bonded glass fiber product, a mass of glass fibers and 1½–15 percent by weight of a binder securing the fibers together and consisting essentially of urea and methylated urea reacted with formaldehyde and present in the ratio of 1 part by weight methylated urea to 2–5 parts by weight urea, and polystyrene in amounts ranging from 1 part by weight polystyrene to 2–5 parts by weight of the resinous reacting product.

7. In a bonded glass fiber product, glass fibers and a binder securing the glass fibers together containing the resinous reaction product of formaldehyde with an amide selected from the group consisting of urea, melamine, guanidine and mixtures thereof and methylated urea present in the ratio of 1 part by weight methylated urea to 2–5 parts by weight amide, a material selected from the group consisting of polybutene, polystyrene, polychloroprene, butadiene-acrylonitrile copolymer, polyethylene and plasticized polyvinyl chloride and present in amounts ranging from 2–20 percent by weight of the binder, and a water repellent resin present in amounts ranging from 1 part by weight resin to 2–5 parts by weight of the resinous reaction product.

8. In a bonded glass fiber product, a mass of glass fibers and 1½ percent by weight of a binder consisting essentially of urea and methylated urea reacted with formaldehyde and present in the ratio of 1 part by weight methylated urea to 2–5 parts by weight urea, polybutene present in amounts ranging from 2–20 percent by weight of the binder, and polystyrene present in amounts ranging from 1 part by weight polystyrene to 2–5 parts by weight of the resinous reaction product.

9. A bonded glass fiber product comprising glass fibers and a binder securing the fibers together containing the resinous reaction product of formaldehyde with an amide selected from the group consisting of urea, melamine, guanidine and mixtures thereof and methylated urea present in the ratio of 1 part by weight methylated urea to 2–5 parts by weight amide, and an oleaginous lubricant in amounts ranging up to 1 percent by weight of the binder.

10. In a bonded glass fiber product, a mass of glass fibers and 1½–15 percent by weight of a binder securing the fibers together and consisting essentially of urea and methylated urea reacted with formaldehyde and present in the ratio of 1 part by weight methylated urea to 2–5 parts by weight urea, and an oleaginous lubricant in amounts ranging up to 1 percent by weight of the binder.

11. In a bonded glass fiber product, glass fibers and 1½–15 percent by weight of a binder securing the fibers one to another consisting essentially of urea and methylated urea reacted with formaldehyde and present in the ratio of 1 part by weight methylated urea to 2–5 parts by weight urea, polybutene present in amounts ranging from 2–20 parts by weight of the binder, and an oleaginous lubricant present in amounts ranging up to 1 percent by weight of the binder.

12. A bonded glass fiber product comprising glass fibers and 1½–15 percent by weight of a binder securing the fibers one to another consisting essentially of urea and methylated urea reacted with formaldehyde in the ratio of 1 part by weight methylated urea to 2–5 parts by weight urea, polystyrene present in amounts ranging from 1 part by weight polystyrene to 2-5 parts by weight of the resinous reaction product, and an oleaginous lubricant present in amounts ranging up to 1 percent by weight of the binder.

13. A bonded glass fiber product comprising glass fibers and a binder securing the fibers together containing the resinous reaction product of formaldehyde with an amide selected from the group consisting of urea, melamine, guanidine and mixtures thereof and methylated urea present in the ratio of 1 part by weight methylated urea to 2-5 parts by weight amide, and a polyhydric alcohol.

14. In a bonded glass fiber product, a mass of glass fibers and 1½-15 percent by weight of a binder securing the fibers together and consisting essentially of urea and methylated urea reacted with formaldehyde and present in the ratio of 1 part by weight methylated urea to 2-5 parts by weight urea, and a polyhydric alcohol.

15. A bonded glass fiber product, comprising glass fibers and 1½-15 percent by weight of a binder securing the fibers together comprising urea and methylated urea reacted with formaldehyde in the ratio of 1 part by weight methylated urea to 2-5 parts by weight urea to form a resinous reaction product, an oleaginous lubricant present in amounts up to 1 percent by weight of the binder, polystyrene in amounts ranging from 1 part by weight polystyrene to 2-5 parts by weight of the resinous reaction product, and a polyhydric alcohol.

16. A bonded glass fiber product comprising glass fibers and a binder securing the glass fibers together containing the resinous reaction product of an amide selected from the group consisting of urea, melamine, guanidine and mixtures thereof, and a material selected from the group consisting of polybutene, polystyrene, polychloroprene, butadiene-acrylonitrile copolymer, polyethylene and plasticized polyvinyl chloride and present in amounts ranging from 2-20 percent by weight of the binder.

17. A bonded glass fiber product comprising glass fibers and from 1½-15 percent by weight of a binder securing the fibers together comprising the resinous reaction product of urea and formaldehyde, and polybutene present in amounts ranging from 2-20 percent by weight of the binder.

18. A bonded glass fiber product comprising glass fibers and a binder securing the glass fibers together containing the resinous reaction product of an amide selected from the group consisting of urea, melamine, guanidine and mixtures thereof, a material selected from the group consisting of polybutene, polystyrene, polychloroprene, butadiene-acrylonitrile copolymer, polyethylene and plasticized polyvinyl chloride and present in amounts ranging from 2-20 percent by weight of the binder, and a water repellent resin present in amounts ranging from 1 part by weight resin to 2-5 parts by weight of the resinous reaction product.

19. A bonded glass fiber product comprising glass fibers and from 1½-15 percent by weight of a binder securing the fibers together comprising the resinous reaction product of urea and formaldehyde, polybutene present in amounts ranging from 2-20 percent by weight of the binder, and polystyrene present in amounts ranging from 1 part by weight polystyrene to 2-5 parts by weight of the urea formaldehyde reaction product.

20. In a bonded glass fiber product comprising glass fibers and from 1½-15 percent by weight of a binder securing the fibers one to another, comprising urea formaldehyde resinous reaction product, polybutene present in amounts ranging up to 20 percent by weight of the binder, polystyrene present in amounts ranging from 1 part by weight polystyrene to 2-5 parts by weight of the urea formaldehyde resin, and an oleaginous lubricant in amounts ranging up to 1 percent by weight of the binder.

21. A bonded glass wool product comprising a mass of glass wool fibers and 1½-15 percent by weight of a binder securing the fibers together into a porous resilient bat and consisting essentially of urea formaldehyde and methylated urea aldehyde reacted together to a cured stage and present in the ratio of 1 part by weight methylated urea to about 2-5 parts by weight urea formaldehyde, a polyhydric alcohol present in amount further to retard the reaction of the urea aldehyde resins, up to 20 percent by weight of polybutene and up to 30 percent by weight of polystyrene.

22. The method of producing bonded glass fiber products of fixed dimension comprising the steps of treating a mass of glass fibers with a binder composition containing from 2-30 percent by weight of urea and methylated urea reacted with formaldehyde to an intermediate stage of polymeric growth and in which the materials are present in the ratio of 1 part by weight methylated urea to 2-5 parts by weight urea, and heating the treated fibers while being compressed to desired shape and density at temperatures sufficient to drive off the diluent and convert the resinous material to set stage.

23. The method of producing a bonded glass fiber product of fixed dimension comprising the steps of treating the glass fibers with a binder containing from 2-20 percent by weight solids consisting essentially of resinous material formed by the reaction of formaldehyde with an amide selected from the group consisting of urea, melamine, guanidine and mixtures thereof in an intermediate stage of polymeric growth, and polybutene in amounts ranging from 1 part by weight polybutene to 2-5 parts by weight of the resinous reaction product, and heating the treated fibers while being compressed to desired shape and density at temperatures sufficient to drive off the diluent and convert the resinous material to set stage.

24. The method of producing a bonded glass fiber product of fixed dimension comprising the steps of treating the glass fibers with a binder composition containing from 2-20 percent by weight of solids consisting essentially of urea and methylated urea reacted with formaldehyde to an intermediate stage of polymeric growth and present in the ratio of 1 part by weight methylated urea to 2-5 parts by weight urea, and polystyrene in amounts ranging from 1 part by weight polystyrene to 2-5 parts by weight of the urea-methylated urea formaldehyde reaction product, and then heating the treated fibers while being compressed to desired shape and density at temperatures sufficient to drive off the diluent and convert the resinous material to set stage.

25. The method of producing a bonded glass fiber product of fixed dimension comprising the steps of treating the glass fibers with a binder composition containing from 2-20 percent by weight of solids consisting essentially of urea and methylated urea reacted with formaldehyde to an intermediate stage of polymeric growth and present in the ratio of 1 part by weight methylated urea to 2-5 parts by weight urea, polybutene in amounts ranging from 1 part by weight polybutene to 2-5 parts by weight of the resinous reaction product, and polystyrene in amounts ranging from 1 part by weight polystyrene to 2-5 parts by weight of the resinous reaction product, and then heating the treated fibers while being compressed to desired shape and density at temperatures sufficient to drive off the diluent and convert the resinous material to set stage.

References Cited in the file of this patent

UNITED STATES PATENTS

| | | |
|---|---|---|
| 2,208,290 | Glycofrides | July 16, 1940 |
| 2,335,102 | Bergin et al. | Nov. 23, 1943 |
| 2,344,733 | Ripper | Mar. 21, 1944 |
| 2,563,289 | Steinman | Aug. 7, 1951 |

OTHER REFERENCES

Hackh's Chemical Dictionary, 3rd edition, page 195,